United States Patent [19]

Siden

[11] 3,931,672

[45] Jan. 13, 1976

[54] DEFORMABLE WIRE STRIPPER

[75] Inventor: Dennis Siden, Portola Valley, Calif.

[73] Assignee: Raychem Corporation, Menlo Park, Calif.

[22] Filed: June 19, 1974

[21] Appl. No.: 480,821

[52] U.S. Cl. ............... 29/427; 81/9.5 R; 30/90.1; 30/345
[51] Int. Cl.² .......................................... H02G 1/12
[58] Field of Search........ 81/9.5 R; 30/346.53, 90.1, 30/345, 346, 254, 350; 83/648, 309; 29/427

[56] References Cited
UNITED STATES PATENTS

| | | |
|---|---|---|
| 992,251 | 5/1911 | Reimfeld.............................. 30/345 |
| 2,563,521 | 8/1951 | Ferriot................................. 30/345 |
| 3,469,488 | 9/1969 | Gaspari................................ 83/648 |
| 3,703,840 | 11/1972 | Kauf................................. 81/9.5 R |
| 3,735,763 | 5/1973 | Shannon ............................ 30/254 |

Primary Examiner—Al Lawrence Smith
Assistant Examiner—Roscoe V. Parker
Attorney, Agent, or Firm—Lyon & Lyon

[57] ABSTRACT

Disclosed is a deformable wire stripper comprising either a single or set of blades fabricated from a deformable material such as a plastic. The material is selected so it will undergo plastic or elastic deformation upon contact with a metal conductor, but yet will penetrate and cause deformation of the wire insulation to be stripped.

6 Claims, 5 Drawing Figures

DEFORMABLE WIRE STRIPPER

BACKGROUND OF THE INVENTION

Conventional wire strippers generally utilize extremely hard metal blades, such as stainless steel, such blades being capable of cutting through both the plastic insulation and metal conductor. For this reason, in the fabrication of conventional wire strippers, the blades must be dimensioned to close tolerances so they will penetrate and cut the insulation, yet leave the conductor substantially untouched. To this end, the typical hand wire stripper comprises a cutting blade having therein a number of notches, or grooves, each notch being dimensioned for use on a different size wire. Such a device requires the operator to properly select the correct notch size, and then carefully close the stripper around the wire so as to cut and penetrate the insulation without damage to the wire. Damage to the conductor is prevalent with such strippers, since such stripping techniques not only requires the operator to carefully select the proper notch, but also requires that close tolerances be maintained in the fabrication of the blades as well as the wires. Where either the wire or the blade notch is out of tolerance, poor stripping or damage to the conductor may result. Inadequate penetration of the insulation may cause an incomplete strip of the insulation, or tearing of the insulation resulting in a non-uniform and ragged edge. Penetration of the blade to a depth of greater than the insulation may result in the cutting, gouging or deformation of the conductor, the damaged area being a prime spot for electrical failure U.S. Pat. No. 3,703,840 in attempting to obviate the requirement of exact dimensioning of the blade to conform about the wire, provides a plurality of thin blade-like members mounted on spring arms so that they may flex, and move relative to each other when closed about a wire. The spring means is so tensioned that the blade members will cut and sever the electrical insulation but will flex upon contact with the metal conductor. However, it is specifically noted that the cutter blade must be made of a metal and preferably of relatively hard steel. It was previously thought that materials softer than that of a copper conductor would have marginal penetration into the insulation making it either impossible to strip such insulation or resulting in an extremely ragged edge at the end of the stripped insulation. In addition, it was heretofore accepted that extremely hard cutting steel or a like metal material was required to insure a reasonable working life.

It is an object of this invention to provide a wire stripper having blades which will strip insulation yet not damage the conductor even if placed in pressure contact therewith. It is another object of this invention to provide such a deformable blade from a single material, without the requirements of springs or flexing configurations.

SUMMARY OF THE INVENTION

These and other objects are accomplished by selecting as the blade material one which, upon application of sufficient force, will penetrate the insulation, deforming and/or cutting it, and upon pressure contact with the conductor, will itself deform rather than deforming or penetrating the conductor.

More particularly, a material which will undergo plastic or elastic deformation is configured to form a cutting edge. The material is engaged with a force exerting means such that upon application of sufficient force, the edge will cut or deform the insulation, after which the insulation can be stripped from the conductor.

PREFERRED EMBODIMENT

This invention is related to an apparatus and process of stripping wires. By use of the term "wire" is meant not only conventional, concentric insulated conductors, for which prior art conventional wire strippers are generally designed, but also, other "wire" configurations for which the present invention is particularly suited. Thus, by the term "wire" is meant, any jacketed conduit in which the conduit is less deformable than the jacket. The term "conductor" as used herein is synonomous with conduit and includes not only electrical conductors, but also optical conductors wherein easily damaged fiber optics materials such as acrylics may be stripped via this invention. In addition, "conductor" may include conduits or pipes for the transmission of liquid or gaseous material, such conduits having an outer jacket, as for example where thermal insulation of the conduit is required. Finally, by the term "wire" is meant not only concentrically positioned conductors and insulation, but also a variety of other conductor-insulation configurations. For example, flat cables, ribbon cables, as well as a plurality of insulated conductors having an outer secondary insulating jacket around and therebetween.

Figure 1:
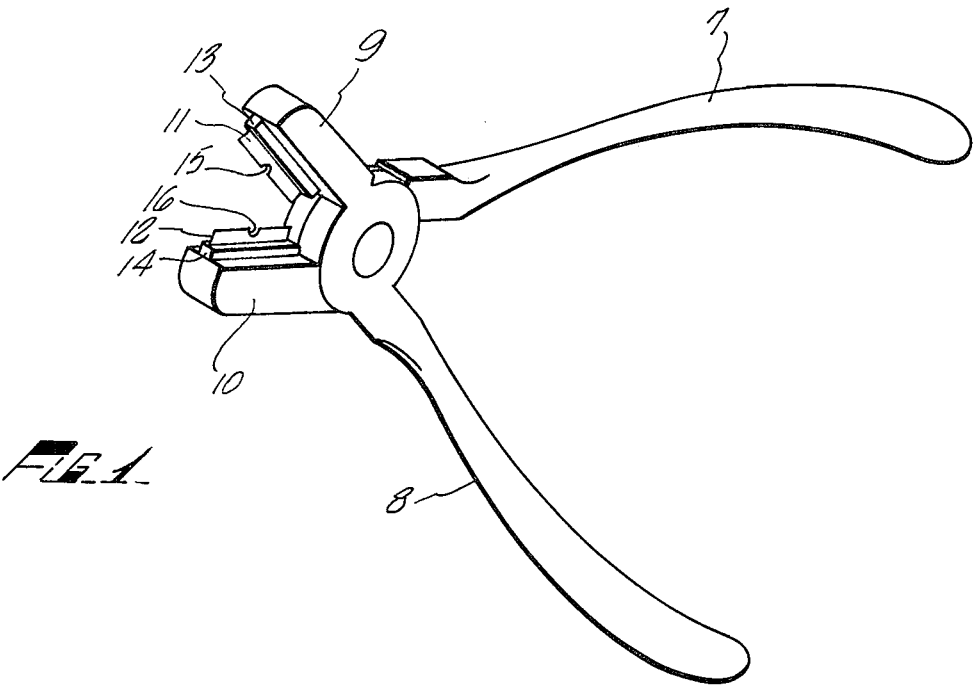
FIG. 1 is a perspective illustration of a wire stripping device according to one embodiment of this invention.

Referring to FIG. 1, a hand wire stripper utilizing the deformable blade of this invention is shown. Handles 7 and 8 are connected to jaws 9 and 10 through which is applied pressure contact to deformable blades 11 and 12. The blades are conveniently mounted in mounting blocks 13 and 14 for easy replacement. Notches 15 and 16 may be pre-formed or may result from the stripping operation itself as will be discussed in greater detail later. Of course, it will be understood that although a simple hand held wire stripper is illustrated, a wide variety of wire stripping designs can be utilized in accordance with this invention, including automatic wire strippers.

Figure 2:
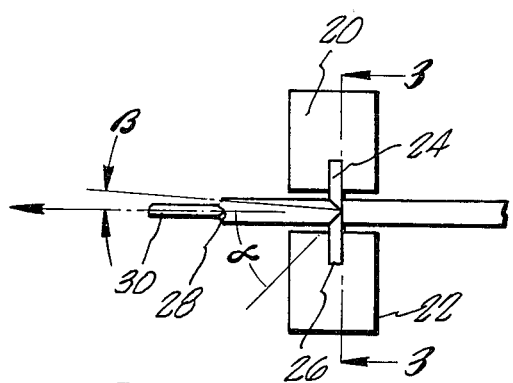
FIG. 2 is an illustration of the use of two deformable blades in the stripping of wire insulation.
Figure 3:
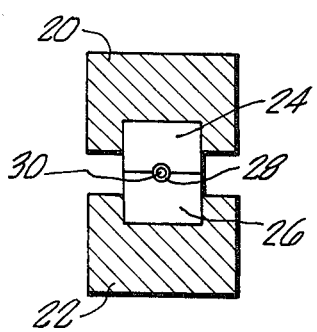
FIG. 3 is a cross-section taken along line 3—3 of FIG. 2.

Referring to FIGS. 2 and 3, a wire stripper having two deformable blades, 24 and 26 are utilized for stripping of the insulation. The blades are set and aligned in tooling blocks 20 and 22 by any convenient means, such as a set screw, not shown. Blades 22 and 24 taper to an edge of less than 0.030 inch and preferably less than 0.005 inch to about 0.001 inch. The angle of taper, $\alpha$ is preferably less than 65° and in most instances preferably between 15° and 45°. Greater angles tapering to an edge of approximately 0.001 inch have a tendency to bend away upon pulling of the wire, resulting in poor or no stripping of the insulation. Ideally, the angle of pull, $\beta$, should be 0°, but variation in pull angle up to 30° appear to have little effect on stripping. Also, as shown in FIG. 2, the direction of pull towards the blade taper is preferred, yet good strips have been obtained by pulling in the opposite direction.

Referring, more specifically to FIG. 3, blades 24 and 26 are shown in the closed position deformed about the insulation. The degree of deformation of the blade, and its degree of penetration into, and deformation of, the insulation, will of course vary with the blade and insulation materials. In accordance with this invention, a "strain balance" must be achieved between the blade, the insulation, and the conductor. The blade should be selected so that it will readily penetrate and deform the insulation, with little or no deformation of its own, but upon total penetration of the insulator and pressure contact with the conductor, it will deform as opposed to damaging the conductor. For relatively soft insulation, such as polyethylene or teflon, with a relatively hard deformable blade such as plexiglass, a 0.005 inch edge has been found to readily penetrate and cut the insulation, and then deform about the conductor. Upon stripping, smooth, uniform edges result. Where harder insulators, as for example where polyvinylidene fluoride type insulations are to be stripped, and a softer blade material, such as nylon 66 is used, the blade need not completely cut and penetrate insulation, but need merely deform it to such an extent that upon pulling of the insulation, a relatively smooth break in insulation is obtained. Surprisingly, I have found that as long as substantial deformation of the insulation is obtained, and the angle of pull is substantially along the axis of the wire, complete cutting of the insulation is not necessary to achieve a uniform edge.

Of course, in accordance with this invention, the proper "strain balance" must be maintained. Thus, for instance, relatively soft blade materials, such as 6/6 nylon or A.B.S. may not be suitable for the stripping of extremely hard varnish insulations, since the blade will substantially deform prior to deformation and penetration into the insulation. By proper "strain balance" is meant that through the stripping operation, the conductor undergoes substantially no strain while the insulation undergoes substanial strain from the applied stress of the blade, and the blade itself undergoes, at most, slight deformation while deforming the insulation but readily deforms upon contact with the conductor. In the case of extremely hard insulations, such as varnishes, it may be necessary to utilize plastic materials having inorganic fillers to act as abrasives and reinforcing agents thereby increasing the toughness of the blade to prevent its deformation during penetration of the insulation. However, greater care must be taken in this case to insure that the conductor is not deformed by the blade material. Where extremely hard, deformable blades must be utilized due to the toughness of the insulation, notches or grooves are preferably pre-cut in the blades as is done with conventional metal wire strippers. However, even here, close tolerances and proper groove selection is not nearly as critical as with sharp metal blades, since even reinforced plastic materials such as glass filled epoxies, tend to deform before actually cutting into and permanently damaging a metal conductor. Pre-notching also is beneficial in reducing the penetration force required, thereby in the case of hand strippers, reducing operator fatigue. Nevertheless, in using relatively hard materials such as epoxy-glass, pre-grooving the blades is advisable so that the blades need not be required to undergo complete deformation around the entire conductor diameter increasing the possibility of damage to the conductor. On the other hand, where relatively soft wiring insulations, such as polyolefins or P.V.C. are to to be stripped, relatively soft blades such as nylon 66 or A.B.S. may be used. Such blades, need not have a notch or groove pre-cut therein since upon contact with the conductor, they will readily deform around the conductor with no resulting damage to the conductor. Surprisingly, and completely contrary to any suggestions of the prior art, I have found that deformable blades, such as nylon may be utilized over extended periods for the stripping of wire, i.e., greater than 100 strips. Also, unexpectedly, the edge of the insulation stripped is in many cases, as smooth and as uniform as wire stripped with a proper sized metal cutting blade.

In addition, since for most applications, the blades need not be pre-notched or grooved to a specific wire size, odd shaped wires such as non-concentric wire may also be readily stripped via this process. Also, multiple wires, even of different diameters, may be stripped in a single stripping operation. For example, I have stripped twisted pairs, wherein the wires were both stripped and straightened via one pulling operation.

Also, wires having stranded conductors have been stripped without any discernable damage to the conductor. For example, polyarylene blades, (Stylan$^T$ from Raychem Corp.), not pre-notched, were found suitable for stripping stranded wire with P.V.C. insulations of A.W.G. sizes between 16 and 30.

Figure 4:
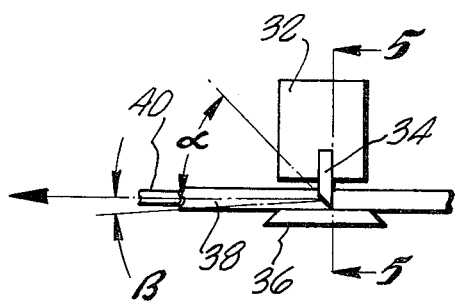
FIG. 4 is an illustration of the use of a single blade and anvil in the stripping of wire insulation.
Figure 5:
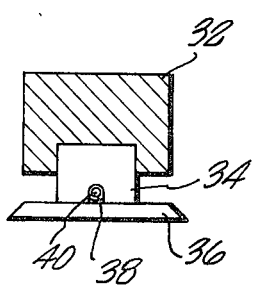
FIG. 5 is a cross-section taken along line 5—5 of FIG. 4.

Referring to FIGS. 4 and 5, an alternative embodiment of this invention is shown. A single blade, either pre-notched, or readily deformable about the conductor, may be utilized in conjunction with an anvil. Deformable blade, 34, is aligned with the wire, and set into block 32 by any convenient means. The angle of taper, $\alpha$, is preferably less than 60°, while the angle of pull, $\beta$, is ideally 0°. The anvil, 36, should be made of a flat hard material, so upon exertion of pressure, as best seen in FIG. 5, the blade 34, will penetrate the insulation 38, and deform about the conductor 40, stopping upon contact with the anvil. It will of course be understood that numerous other blade configurations utilizing deformable blades may be designed for use in accordance with this invention.

Although surprisingly, we have found that relatively soft deformable blades exhibit good stripping properties for a number of strips, it will be understood that for optimum reliability the blades may be used on a "one shot" basis. Since the cost of the blade material may be kept relatively inexpensive, i.e., polystyrene, and little or not machining is required, by achieving the proper "strain balance" between the insulation, conductor and blade, an excellent cut, with no damage to the insulation may be achieved by utilizing a fresh blade for each strip. Obviously, as even in the case with pre-notched metal baldes, the quality of the strip will deteriorate over extended use of the same blade. However, unlike pre-notched stainless steel blades, the use of a fresh blade after each strip is not economically prohibitory. Where high quality electrical terminations are required, the cost of constant replacement of a plastic deformable blade, is minimal. Also, to achieve such continuous replacement of the blade, it would be understood that a means may be provided in the wire stripper device for storing a number of blades and automatically unloading the used one and loading a fresh one after each strip. Also, used blades may be readily recycled by heating them to their melt temperature to reform the edge.

This invention will become apparent from the following more specific examples.

EXAMPLE I

Irradiated P.V.C. insulated wire (Raychem Rayovin[R] 21/011-22) was stripped using a nylon 66 blade. Blades with variation in taper to an edge of 0.001 inch were evaluated, the results of which are summarized in Table 1. The taper was measured as shown by the angle alpha in FIG. 2.

Table I

| (°) | Stripping Force (lb.) | Remarks |
| --- | --- | --- |
| 15° | 7.0 | always stripped |
| 30° | 7.0 | always stripped |
| 45° | 6.0 | stripped 50% of time |
| 50° | 4.0 | no strip |
| 60° | 2.0 | no strip |
| 75° | .2 | no strip |

From the table, it can be seen that variations in blade geometry may produce variations in stripping results. This is due to the amount of penetration force that the blade can exert on the wire insulation as well as the amount of shear stress it can withstand upon pulling. If the penetration force is high enough, plastic deformation of the insulation will occur and stripping will result unless shear stress of the blade is exceeded. On the other hand, if the angle is too great, the blade material will either deform at too low a stress level during penetration of the plastic or will be sheared off during pulling of the wire.

EXAMPLE II

This example demonstrates the importance of blade material on stripping results. A P.V.C. insulated wire, as in Example I (Raychem Rayovin[R] No. 21/011-22) was stripped using various blade materials tapered at a 45° angle to an edge of 0.005 inch. The results are summarized in Table II. $F_s$ represents the force required to strip while $F_p$ represents the force required to penetrate the insulation.

Table II

| Blade Material | $F_s$(lb.) | $F_p$ | Remarks |
| --- | --- | --- | --- |
| ABS | 3.5 | 4.7 | no strip |
| Polystyrene | 2.3 | 12.3 | stripped |
| Epoxy-Glass(G-10) | 3.0 | 13.0 | stripped |
| Acrylic Plexiglass | 4.8 | 12.0 | stripped |
| Nylon 66 | 4.1 | 6.8 | stripped inconsistently |
| Polycarbonate | 2.6 | 8.8 | stripped |
| Polyarylene (Stylan from Raychem Corp) | 5.7 | 8.7 | stripped |

As can be seen from Table II, the force required to penetrate the P.V.C. insulation was greater than 8 lbs. Where softer blade materials were used, which deformed at less than 8 lbs., poor stripping resulted. Harder materials, which did not deform at the force required to penetrate the insulation, such as plexiglass and polystyrene, gave excellent stripping results. Although the most suitable blade material may vary from insulation to insulation, deformable materials ranging in hardness between a Rockwell harness of M30 and M130 when tested via ASTM Test Method D785 are best suited for use as deformable blades. Although inexpensive thermoplastic materials which will undergo plastic deformation upon contact with the conductor are preferred and adequate for most applications, tougher, thermosetting materials such as epoxy-glass, are also contemplated by this invention for hard to strip insulators. Also, elastomeric materials which undergo elastic deformation during stripping but recover to the original shape after stripping may be utilized, provided that the elastomer is substantially less deformable than the insulation to be stripped.

EXAMPLE III

Example III demonstrates the dependence of deformable stripping of wire insulation. A blade material of nylon 66 tapered at a 45° angle to a sharpness of 0.005 inch was evaluated with various insulators over 22 A.W.G. stranded wire. The results are summarized in Table III.

Table III

| Wire | $F_s$(lb.$_f$) | Remarks |
| --- | --- | --- |
| Irradiated P.V.C. (Rayovin No. 21/011-22 Raychem Corp.) | 3.9 | stripped inconsistently |
| Thermorad (irradiated polyolefin, Raychem Corp.) | 4.5 | stripped |
| Non-irradiated P.V.C. | 4.1 | stripped |
| Polyethylene telephone wire(from Western Electric) | 4.2 | stripped |
| Spec 44(polyvinylidene fluoride polyethylene wire) | 9.1 | no strip |

From Table III, it can be seen that a relatively soft, inexpensive thermoplastic blade material, such as nylon 66 may be used to strip common insulators such as P.V.C. and polyethylene. On the other, such a blade material is not suited for the stripping of extremely tough insulators such as polyvinylidene fluoride jacketed polyethylene. However, other deformable blade materials were used with success in stripping of this insulation, as for example G 10 epoxy-glass.

Having specifically described the invention, what is claimed is:

1. A process for stripping insulation from wire comprising contacting the insulation with a material exhibiting plastic or elastic deformation greater than that of a conductor with a force sufficient to cause substantial deformation of the insulation via penetration by the material into the insulation; pulling the insulation substantially along the wire axis while maintaining the penetration force, the pull force being sufficient to cause the insulation to sever at the point of penetration whereby the insulation may be stripped without deformation of the conductor.

2. The process of claim 1 wherein the wire comprises a plurality of twisted insulated conductors, said conductors being both stripped and straightened in one contacting and pulling operation.

3. The process of claim 1 wherein the wire comprises a plurality of insulated conductors of varying sizes, said conductors being stripped in one contacting and pulling operation.

4. The process of claim 1 wherein the wire comprises an insulated conductor wherein the insulation is not concentric with the conductor.

5. The process of claim 1 wherein the deformable material comprises a plurality of deformable blades positioned so as to concentrically deform about the conductor.

6. The process of claim 1 wherein the deformable material comprises a single blade which contacts the wire positioned over an anvil.

* * * * *